Oct. 11, 1966   G. FIAT   3,278,746
GEOPHYSICAL SURVEY METHOD COMPRISING DETECTING
INFRARED IN TWO WAVELENGTH BANDS
Filed Sept. 20, 1962   3 Sheets-Sheet 1

GIDEON FIAT
INVENTOR.

BY
Benjamin DeWitt
ATTORNEY

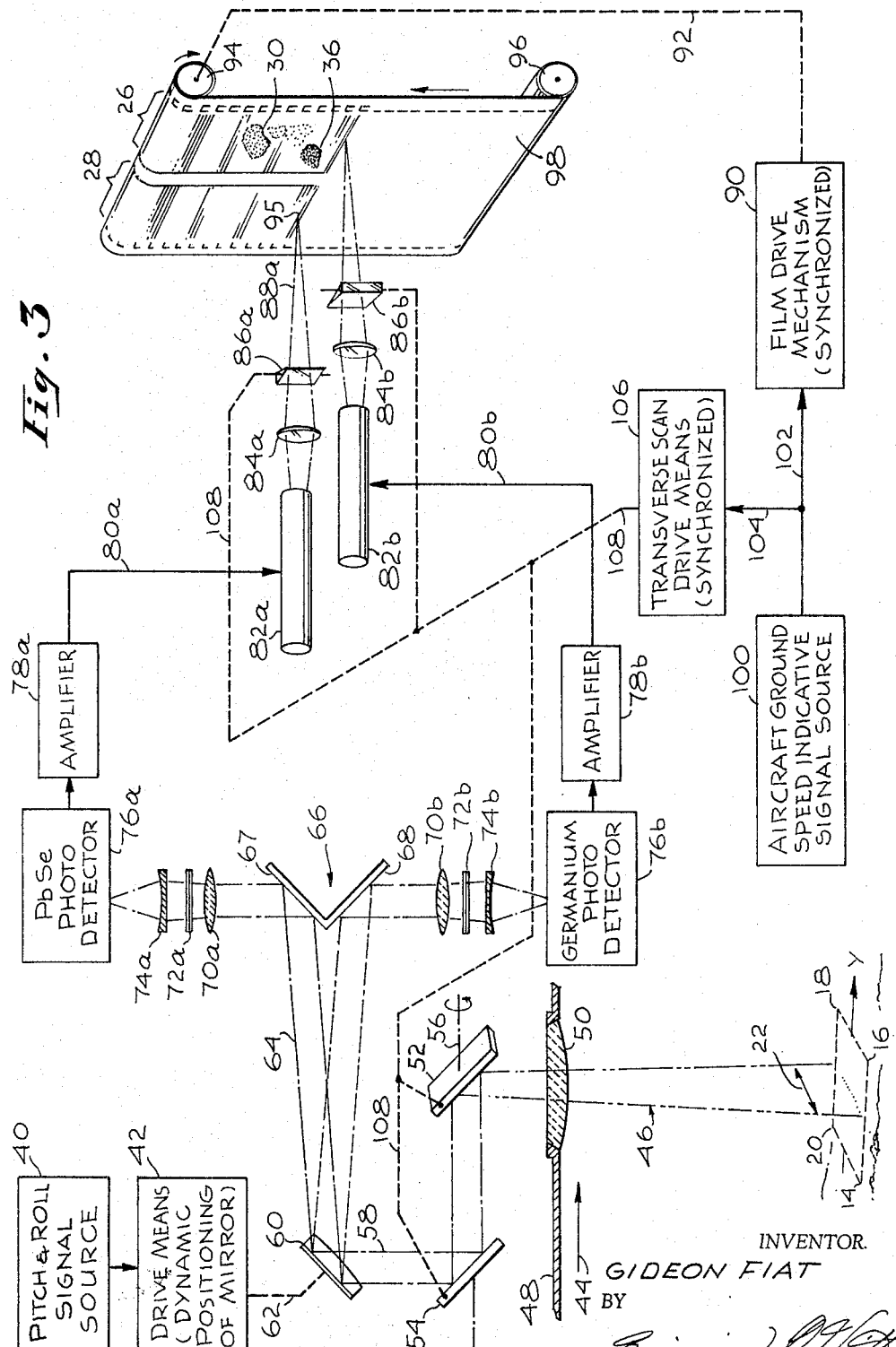

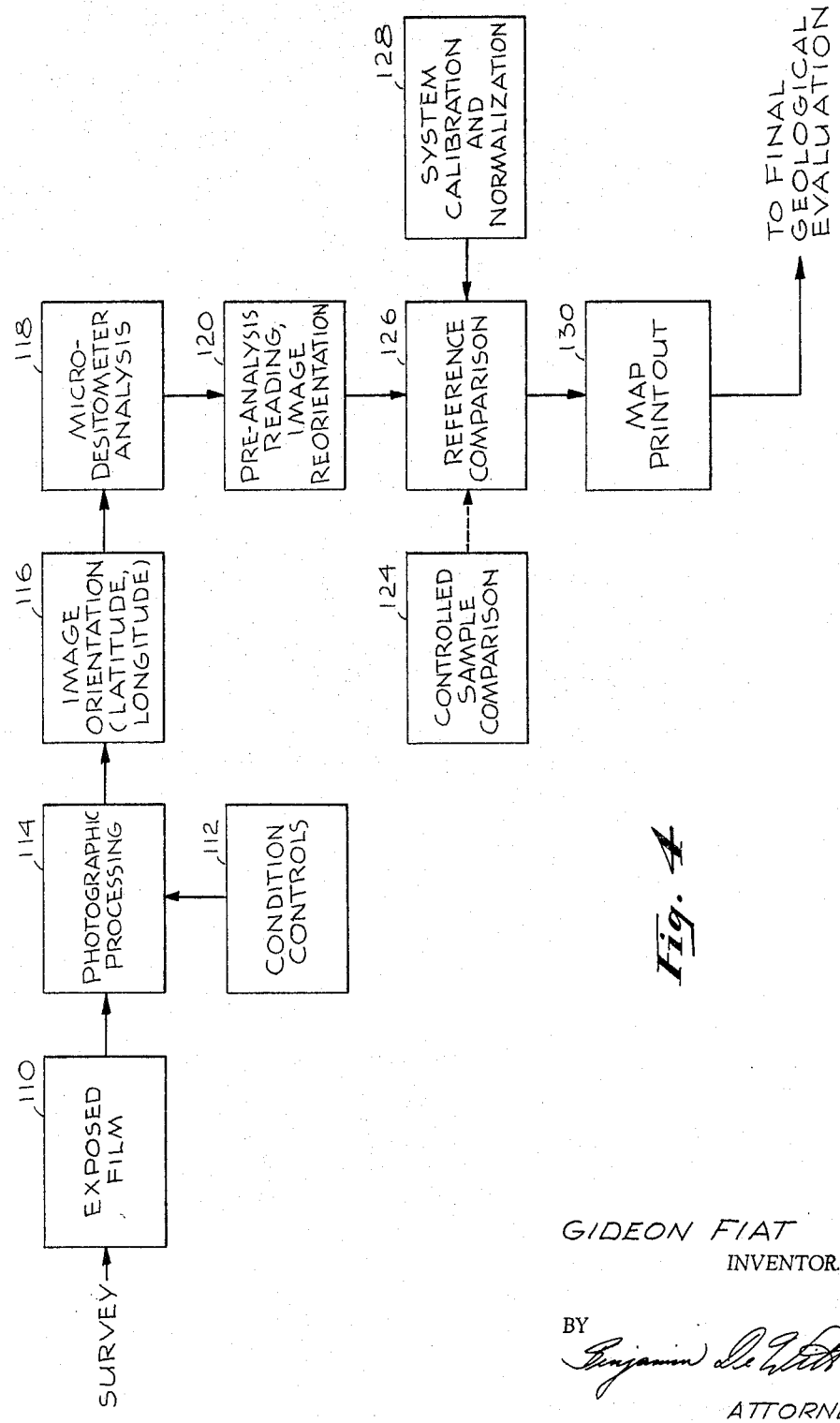

United States Patent Office 3,278,746
Patented Oct. 11, 1966

3,278,746
GEOPHYSICAL SURVEY METHOD COMPRISING DETECTING INFRARED IN TWO WAVELENGTH BANDS
Gideon Fiat, Los Angeles, Calif., assignor, by mesne assignments, to said Fiat and Bill Noel, both of Los Angeles, Calif., doing business as Ormad Systems
Filed Sept. 20, 1962, Ser. No. 224,964
8 Claims. (Cl. 250—83.3)

My invention relates generally to methods and apparatus for conducting geophysical surveys, and more particularly to methods and apparatus for location and identification of surface and subsurface deposits of minerals, specific materials or foreign objects such as land mines or the like and in which the infrared emissivity characteristics of materials are utilized to derive identifying information from the radiation emitted from surface or subsurface materials.

The method and apparatus of my invention finds one particular application in the art of geophysical surveying for location of petroleum deposits or geological features favorable to the accumulation of such deposits. Modern petroleum exploration is carried on by examination of the orogenic structures of the rocks and facies changes in the sediments. Ordinarily the presence of petroleum, gas or liquid, is inferred from the results of such examination, combined with related petrological and mineralogical data, and by applying a comprehensive geologic understanding of the marine processes responsible for the accumulation of organic remains and the metamorphic and metasomatic processes through which these organic remains are converted into oil. Prior art methods of exploration, as just described, wherein the purpose is to locate geological structures which are likely to infer the presence of petroleum deposits are conventionally limited by inaccessibility of certain area such as heavy forests and swamps and is limited by the almost prohibitive number of man hours which may be consumed in field exploration by geologists. Accordingly, heretofore such methods have been supplemented and/or complemented by airborne magnetometric and gravimetric methods as well as geochemical methods involving soil analysis and the more recent gamma ray methods which are based upon the existence of variations in the gamma ray radiation intensity from the earth in the vicinity of petroleum or natural gas deposits. The prime disadvantage of all the above-mentioned prior art survey methods is that even though the results of an airborne survey may indicate the presence of a structure favorable to the accumulation of petroleum, in the final analysis there still exists no infallible method to determine the presence of petroluem other than actual drilling in the area which is indicated to be promising. In far too many instances such surveys indicate the possible presence of oil and substantial sums are expended in fruitless drilling.

Accordingly, it is a primary object of the present invention to provide an improved method of geophysical exploration utilizing electromagnetic radiation perception, in infrared regions of the spectrum, to provide a degree of precision in the identification of geological structures which is superior to currently practiced methods.

It is a further object of the present invention to provide a new and improved method and apparatus for conducting geophysical surveys from an aircraft in flight by recordation and subsequent analysis of infrared radiation intensities emanating from the terrain traversed.

It is another object of my invention to provide a method and apparatus for geological surveying in which differential infrared emissivity in two separate infrared wavebands is correlated with empirically predetermined infrared emissivity characteristic of specific materials which are desired to be located.

A different object of my invention is to provide an apparatus for and a method of obtaining separate photographic records of data relating to the infrared radiation, in at least first and second wavelength ranges, which emanates from incremental portions of a terrain.

A still further object of my invention is to provide a method of evaluating and interpreting data of the type described in terms of geophysical features and structure of the terrain.

A general object of my invention is to provide geophysical surveying apparatus having improved capability for distinguishing textural variations in surface and subsurface terrain components.

In accordance with a preferred method and apparatus of my invention, the foregoing objects are accomplished generally as follows. An aircraft carrying apparatus in accordance with one aspect of the invention is caused to travel along a systematic series of adjoining traverses, preferably at a specific altitude over the area which is to be surveyed. During such traverses, at least some specific portions of the area are continuously photographed by visible light to provide conventional strip films which may be geographically correlated with previously known objects and features of the terrain. In that manner a record of the precise position of the aircraft relative to terrain, at all times, is provided. Additionally, during such traverses of the terrain an infrared radiometric apparatus carried by the aircraft is utilized to generate first and second continuous strip photo records of the terrain. The first photo record preferably is a recording of the infrared radiation which emanates from the terrain traversed within a shorter wavelength portion of the infrared region from about 1.0 to 5.5 microns wavelength. The second and similar (but not identical) photo record is generated by recording the radiation in a longer wavelength portion of the infrared region from 6 to 14 microns, which emanates from the traversed terrain. Subsequently, the abovementioned infrared photographic records are developed and incrementally measured on a point-to-point basis to produce incremental information representative of the absolute intensities of infrared radiation and the differential of infrared radiation between the two bands which emanates from the various portions of the terrain. In accordance with further features and embodiments of the invention, the abovementioned incremental information is correlated with empirically predetermined information concerning the emissivities of various materials at different portions of the infrared region so that the geological nature of the individual components of the terrain may be determined solely from the records of infrared emission or from those records as they may be supplemented by maps of gamma ray activity and other records of the geological structures in the particular terrain.

The foregoing and other objects and features and advantages of my invention will be more clearly apparent from the following description when taken in accordance with the accompanying drawing throughout which like reference characters indicate like parts, which drawing forms a part of this application and in which:

FIG. 3 is a diagrammatic illustration plurality in block diagram form of the data recording apparatus carried by the aircraft FIG. 1; and FIG. 4 is a flow diagram illustrative of successive steps in the method of utilizing the data records which are produced by the apparatus of FIG. 3.

Figure 1:
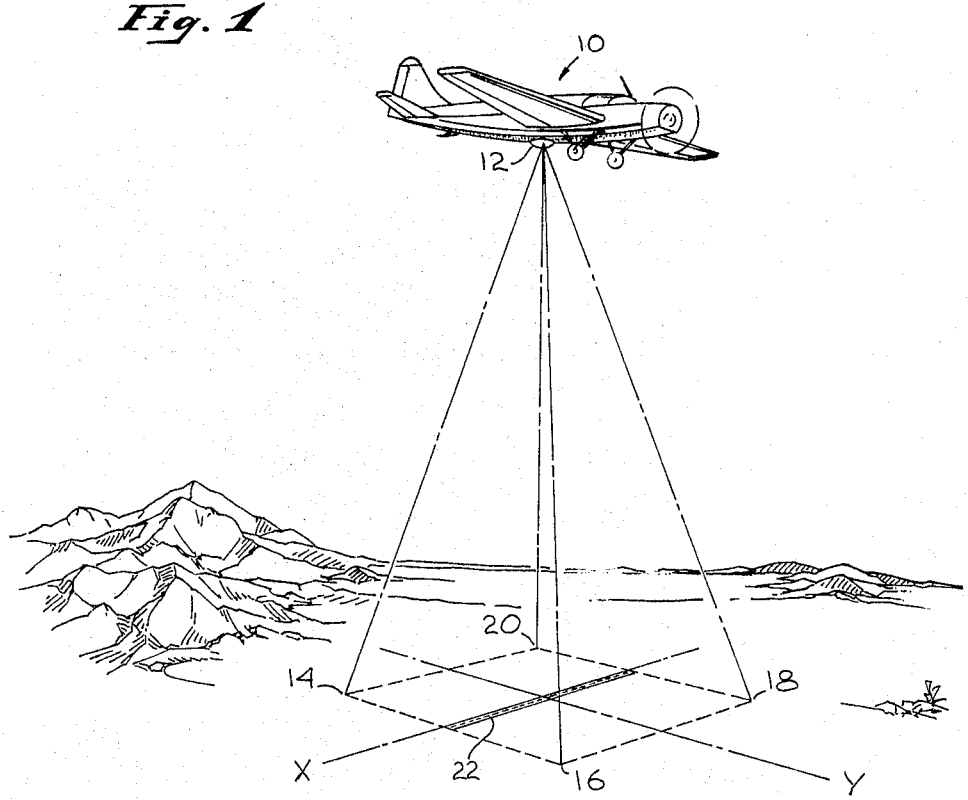
FIG. 1 is a diagrammatic illustration of an aircraft which carries one embodiment of radiometric apparatus operative to survey a terrain in accordance with the method of my invention.

The method of geophysical surveying of the present invention may be best understood after a familiarity with one embodiment of apparatus for practicing the invention is achieved. Referring to the drawing, the radiometer apparatus shown diagrammatically in FIG. 3 is mounted within or carried by an aircraft 10, as shown in FIG. 1. The aircraft 10 may be any one of various conventional vehicles, but preferably is a plane capable of flying at relatively low speeds and at altitudes of about 500 to 1000 feet. As the aircraft 10 moves along a systematic series of adjoining traverses over the terrain and parallel to the Y axis (as shown in FIG. 1), the radiometer apparatus 12 continually scans transversely of the line of flight to detect infrared radiation which may emanate from each and every incremental portion of the terrain. In FIG. 1 the lines 14–16 and 18–20 define the width of the terrain strip which is scanned during a single traverse. The area 22 along the X axis indicates the portion of the terrain which is viewed during a single transverse scanning cycle. It will be appreciated that the entire area 22 is not observed by the radiometer 12 at one instant, but rather successive ΔX portion of the area 22 radiates along a light path 46 and through a window or optical element 50 supported by the skin 48 of the aircraft. The radiation is received by an optical system comprising first and second scanning mirrors 52 and 54 which are disposed substantially at a 45 degree angle to the vertical and which pivot in an oscillatory manner about a longitudinal axis 56 extending through the centers of the mirrors 52 and 54 and parallel to the aircraft line of flight. Oscillation of the scanning mirrors 52 and 54 is controlled by a mechanical linkage, indicated diagrammatically by the numeral 108, which is coupled to and driven by a transverse scan drive mechanism 106. It should be observed that as the mirrors 52 and 54 oscillate through a small angle around the axis 56, the exiting radiation beam 58 scans back and forth across the surface of an inertial mirror 60. That scanning action accomplishes the desired result of causing the photodetectors to sequentially "see" successive ΔX portions of the terrain area 22. More specifically, the inertial mirror 60 is a device to enable unambiguous transverse scanning of the terrain area 22 even in the presence of motion of the aircraft about its longitudinal axis. A pitch and roll signal source 40 which may comprise a gyroscopic mechanism or an inertial guidance mechanism of a conventional type is carried in the aircraft and provides an electrical output signal indicative of roll of the aircraft about its longitudinal axis or pitch of the aircraft about a transverse horizontal axis. The roll and pitch signals are applied to and utilized by a servomechanism 42 which constitutes a drive means for dynamically positioning the mirror 60 to compensate for or eliminate the effects of roll and pitch of the aircraft.

Since the servomechanism 42 may constitute any one of various arrangements which are well known in the electronics arts and does not form an essential part of the present invention, it need not be described in detail herein. For present purposes it should merely be understood that the drive means 42 and the mechanical coupling 62 from the same to the inertial mirror 60 constitute a mechanism for adjusting the angular position of the light beam 64 in a manner such that successive portions of the terrain area 22 are imaged at the photo detectors 76a and 76b in the desired and regular time sequential manner. The light beam 64, as reflected from the inertial mirror 60, impinges on a preferably V-shaped front surface mirror 66 having first and second leg portions 67 and 68 disposed substantially at right angles to one another. As the scanning mirrors oscillate, the V-shaped mirror receives the image of each ΔX scan element of the area 22 first on the surface 67 and a fraction of a millisecond later on the reflecting surface 68. That is, the scanning mirrors 52 and 54 cause each ΔX image element to sweep across the mirror 66 from surface 67 to surface 68 so that each ΔX image element is first observed by photodector 76a and slightly later by detector 76b.

The amplifier 78a may be provided with a signal time delay slightly longer than that of amplifier 78b in order to correct for the signal phase shift introduced by the scanning action. One of the light beams from mirror 66 is directed by surface 67 through one or more optical elements 70a and through an optical filter 72a which is designated to transmit that portion of the infrared region between 5.5 and 14 microns wavelength. Optical filters having such characteristics are known in the art and may be readily selected or manufactured by selection of optical materials having desired characteristics and deposition of certain known coatings on the optical materials. In accordance with the present invention it may be desirable to cool the elements 70a and 72a to achieve greater sensitivity and more critical control of the band pass characteristic. The light transmitted by filter 72a is refracted by further optical element 74a and is directed to a photo detector 76a which preferably comprises a lead selenide photo detector which is cryogenically cooled to about 70 degrees Kelvin. It will be understood from the foregoing that the photo detector 76a produces an electrical output signal similar to that produced by a television camera tube but representative of the infrared emission from the terrain in the 1 to 5.5 micron wavelength portion of the infrared band. The optical system, including elements 70b, 72b and 74b is functionally similar to the system just described except that the light beam reflected by the second surface 68 of the V-shaped mirror 66 is differently filtered. More specifically, the band pass filter 72b is not identical to the filter 72a but rather is designed to transmit the 6 to 14 micron wavelength portion of the infrared spectrum while excluding the shorter wavelength portion of the infrared band. Accordingly the system including elements 70b, 72b and 74b directs to the second photo detector 76b a beam of radiation corresponding to the long wavelength infrared radiation emanating from successive transversely sequential portions of the terrain area 22. Accordingly, the photo detector 72b produces a video signal output representative of the radiation of the terrain area 22 in the longer wavelength portion of the infrared region (5.5 to 14 microns). In accordance with the present invention, the second photo detector 76b is preferably a cryogenically cooled germanium photo tube maintained at a temperature of about 4.2 degrees Kelvin. The output signals from photo detector 76a and 76b are fed through identical electronic amplification channels 78a and 78b which may comprise any one of various known chopper amplifiers conventionally used in the photometric arts. The amplified output signals from those amplifiers are respectively fed by way of circuit connections 80a and 80b to a pair of similar glow tube elements 82a and 82b which convert the video signals to intensity modulated light beams. The light beams are focused by conventional optical elements 84a and 84b and focused to a point on a film strip 98. The first light beam 88a, before impinging on the film 98, is transmitted through a prism 86a which oscillates about its vertical axis as shown in FIG. 3. Similarly, the second light beam 88b passes through a second prism 86b which is identical to the first prism 86a. Oscillation of the prisms 86a and 86b in a synchronous manner is achieved by a mechanical or electronic intercoupling of the same to the scanning mirrors 52 and 54 as indicated diagrammatically by the dotted line 108. Preferably, in accordance with the present invention, the scanning prisms and the scanning mirrors 52 and 54 are all synchronized with the ground speed of the aircraft by means of a transverse scan drive means 106 which is coupled to the scanning mirrors and the scanning prisms and which is controlled by a ground speed indicative signal derived from a source 100 and applied by way of circuit connection 104. The synchronously rotating or oscillating prisms 86a and 86b, respectively, cause the focused light beams 88a and 88b to scan transversely across the film strip 98. More specifically, the beam 88a scans from left to right across the left hand portion 28 of the film strip in synchronism with the scanning of the terrain area 22 by the photo detector 76a and its associated optical and scanning system. Accordingly, the beam 88a produces on the film portion 28 a space distributed image of the terrain traversed by the aircraft with the transversely extending portion 95 of the film being an infrared picture of the terrain area 22 as shown in FIG. 1. Of course, the picture generated on the left hand half of the film strip 28 is a pictorial representation or image of the radiance of the terrain in the shorter wavelength portion (1.0 to 5.5 microns) of the infrared region. Similarly, the image generated by the beam 88b on the right hand portion 26 of the film strip is representative of the radiance of the terrain in the longer wavelenth portion of the infrared region. Full appreciation of the manner in which the light beams 88a and 88b constitute a picture of the terrain may be had by considering the beams 88a and 88b as analogous to the intensity modulated beam in a television receiver picture tube. The beam 88a scans transversely of the film portion 28 in much the same manner the television cathode ray beam is scanned horizontally of the picture tube screen. Vertical distribution of the picture elements on the film 98 is achieved, not by vertical deflection of the light beam 88a but rather by continuous movement of the film strip 98 vertically past the beams 88a and 88b. Specifically, a roll of unexposed film 96 is provided below the plane of the beams 88a and 88b and is conveyed past the beams by means of a take-up roll 94 which is driven in clockwise direction by a mechanical connection 92 to a film drive mechanism 90. The film drive mechanism is preferably controlled by an electronic synchronizing signal derived from the aircraft ground speed signal source 100. Thus the film is driven past the light beams 88a and 88b precisely in synchronism with the rate at which the aircraft 10 traverses successive transverse elemental portions 22 of the terrain.

It is known that the atmosphere of the earth has a high degree of absorption in certain specific portions of the infrared spectrum. The characteristics of the atmosphere, however, are such that it transmits with relatively high efficiency in a short wavelength portion from about 1.0 to about 5.5 microns wavelength and in a long wavelength portion from about 8 microns to 14 microns wavelength. Thus, in accordance with the present invention it is desirable to use that specific short wavelength portion and that specific long wavelength portion for recordation of terrain emissivity data. It should be appreciated, however, that restriction to those particular wavelengths is not essential to the present invention. If the present invention is to used for a geophysical surveying of objects which are not obscured by an atmosphere such as that of the earth (for example, the moon), then it may be desirable to select first and second wavelength ranges which are different than those just described. Moreover, detection of the entire short wavelength range from 1.0 to 5.5 microns is not essential. I contemplate that in some applications it may be desirable to restrict the bandpass characteristic of the filter 72a so that it would transmit only a lesser wavelength range (for example, the range from about 3 microns to 4 microns). Similarly, the apparatus of the present invention may be arranged, if desired, to detect only a lesser portion of the above-described long wavelength portion.

A system in accordance with FIG. 3 using presently available cryogenically cooled photo detectors has a signal sensitivity as follows:

for an emissivity $\epsilon = 0.25$, $T_{avg}=300°$ K.
1–5.5μ band, $\Delta T \approx 0.27°$ C.
8–14μ band, $\Delta T \approx 0.031°$ C.

For $T_{avg}=300°$ K., the sensitivity to changes in emissivity will be

1–5.5μ band, $\Delta\epsilon = 9 \times 10^{-4}$
8–14μ band, $\Delta\epsilon = 1.1 \times 10^{-4}$ These sensitivities are obtained with a 3 milliradian resolution scanning laterally over an angle of 14.3 degrees for the aircraft flying 100 ft./sec. at an altitude of 500 feet. The area coverage is 12,500 square feet per second.

A variety of possible configurations and circuits in accordance with the concepts discussed heretofore in connection with FIG. 3 are practical, depending on the degree of detail which is required to be resolved in a particular application. Providing good picture resolution on the film strip 98 requires an electronic bandwidth in the system equal to at least twice the rate at which the optical resolution elements of the terrain are scanned. For an aircraft flying at an altitude of $h$ and speed V, the time to traverse one resolution element is $$T_s = \alpha \frac{h}{V}$$

where $\alpha$ is the length of the square resolution element (or scanned field of view).

This time, then, is the time available to scan one line. The number of resolution elements which can be scanned in this time, for a bandwidth B, is $$E = \frac{B}{2} T_s$$

and the angle swept out laterally is $$\beta = \alpha E = \frac{B}{h} \frac{h}{V} \alpha^2$$

If $\beta$ is small enough to use a linear approximation, the area scanned out per unit time is $$\dot{A} = h\beta V = \frac{B}{2} h^2 \alpha^2$$

The required bandwidth is then $$B = \frac{2\dot{A}}{h^2 \alpha^2}$$

For clarity of illustration and understanding of FIG. 3, the beam splitting funtional portion of the system has been disclosed as comprising the V-shaped front surfaced mirror 66. Use of such structure is not essential to the present invention and various other known beam splitting techniques may be used in accordance with the broader aspects of my invention. Specifically, and by way of example, I contemplate that splitting of the light beam 64 into first and second wavelength optical images may be accomplished by a dichroic mirror system of the type which is disclosed in United States Patent No. 2,960,002, issued November 15, 1960, to C. M. Auble et al. In accordance with the present invention it is preferable to use a dichroic mirror which reflects the shorter wavelength spectrum portion and transmits the longer wavelength spectrum portion of the infrared region. Specifically, such a dichroic mirror may be formed of a calcium fluoride material sold under the trade name "Irtran-2" by Eastman Kodak Company, Rochester 4, New York. When such material is used, its normal transmission characteristic may be adjusted to conform to the requirements of the present invention by applying a coating of magnesium fluoride to the reflecting surface thereof. Persons skilled in the art will appreciate that a large variety of coatings may be added to such a mirror structure to achieve any of a great variety of spectral transmissions and spectral reflectivity characteristics.

The apparatus of FIG. 3, as heretofore described, creates first and second strip photographs representative, respectively, of the radiances of the terrain in first and second portions of the infrared spectrum. While those photographs, when developed, are useful for visual examination and give considerable information of geophysical interest, my invention contemplates considerably more than mere visual examination of the differential infrared photographs. After traverses of a predetermined area have been completed and the film 98 has been developed, the data provided on the photographic records is analyzed and correlated with normal aerial photographs of the same terrain and with other pre-existing geophysical data to give more complete information concerning the identy of specific surface and subsurface materials in the terrain. From the infrared photographs as supplemented by visual light photographs and other data, complete geological maps of the terrain surveyed may be generated.

Figure 2:
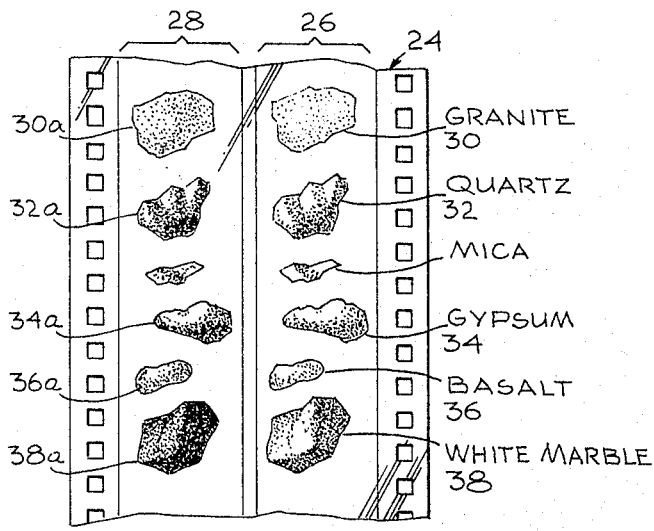
FIG. 2 is an illustration of a photographic record of the type which may be obtained and utilized in the method of my invention.

More specifically, the film 98, when developed, has a form generally as shown in FIG. 2. It should be understood that FIG. 2 is not intended to be a precise duplication of a photograph of a specific terrain but rather is an exaggerated illustration to emphasize the geological information which may be obtained from differential infrared photography. As shown in FIG. 2, the film strip 24, which preferably is a 70 mm. or 90 mm. film, comprises a left-hand section 28 and a right-hand section 26, respectively representative of the terrain radiances in the longer wavelength portion and the shorter wavelength portion of the infrared region. The first element 30 is intended to represent a piece of granite in the terrain. In the film section 26 it has a relatively low density as compared to a corresponding portion 30a of the film section 28. This difference in density on the two sections of the film results from the fact that granite has a high infrared emissivity in the long wavelength portion and a relatively low emissivity in the short wavelength portion of the infrared region. It will be appreciated that measurement of the difference between the densities of the film in the corresponding portions 30 and 30a will provide a density ratio which is identifiable as being characteristic of granite. Similarly, the density ratio of the areas 32 and 32a may be measured to obtain a density ratio which is known to be characteristic of quartz, and is therefore indicative of the presence of quartz at the specific incremental area of the terrain. Similar measurements may be obtained to indicate the presence in the terrain of other materials such as mica, gypsum, basalt, etc. as indicated by FIG. 2. It should be understood that the film density in the film section 26 represents the integral under the spectral curve of the particular materials between the limits 1.0 and 5.5 microns. The density in the film section 28 is similarly representative of the integral under the spectral characteristic curve of the particular material between the limits 8 and 14 microns. In accordance with my invention, the foregoing differential radiance may be obtained either manually by measuring incremental areas of the film on a point-by-point basis or the data may be derived on a semi-automatic or fully automatic basis.

FIG. 4 illustrates a system and procedure for reducing the recorded infrared data to a form useful for geological purposes. The exposed film 98, taken from the apparatus of FIG. 3 at the end of a series of traverses, is photographically processed as indicated by the block 114 with the processing conditions being accurately controlled in order to maintain the fidelity of the radiance information which is obtainable from the absolute density values in the film. After such film processing, the film negatives are either manually or optically correlated with similar films of the same terrain made by visible light photography and the exact geographical location of particular objects shown on the infrared film is thereby established; that is, correlation of the film with visible light photographs enables marking of the infrared film with precise latitude and longitude identification data. After such organization of the infrared data, the films are fed through an automatic dual channel microdensitometer to produce data in the form of a pair of electrical signals representative respectively of the absolute density of each and every point on the film strip portions 26 and 28. Preferably the microdensitometer is arranged to also provide a signal indicating the ratio between densities at corresponding points and a signal representing the differential between the absolute densities at corresponding points. In accordance with the method of the present invention it is desirable to use a microdensitometer apparatus which scans and reads the film strip portions 26 and 28 in a simultaneous and synchronous manner so that two electronic signals may be derived and recorded, with simultaneous time sequential portions of the two signals being representative of precisely the same incremental portions of the film and, hence, representative of the terrain radiance in the two portions of the infrared region. A dual channel microdensitometer apparatus capable of reading the two film strip portions 26 and 28 in a precisely synchronous manner is most desirable. I prefer to use a microdensitometer of the type which utilizes flying spot scanning. In such apparatus the scanning beam traverses the film from side to side as the film is moved longitudinally. The signals read out by the densitometer phototubes preferably are recorded on a magnetic tape or paper chart recorder. Densitometers which may be utilized in the system and method of my invention are known in the art and are commercially obtainable. For example, one such apparatus is made and sold by Hogan FAXimile Corporation, New York, N.Y., a subsidiary of TELautograph Corporation and is described in their product data bulletins Nos. 12 and 19. Another similar microdensitometer is that sold as Model No 1558 by the Frank Herrnfeld Engineering Corporation, 5716 Camille Avenue, Culver City, California. It should be understood that most prior art densitometers are single-channel apparatus and while these may be used in the method of my invention, it is considered preferable to use a two-channel unit for simultaneously reducing the first and second film strips to a pair of time synchronized information bearing video signals. Such a dual microdensitometer is essentially like a conventional unit but with all the functional components and circuits duplicated. The mechanisms and system philosophies of another densitometer scanning apparatus which may be adapted to the present invention are further disclosed in detail in a conference paper presented at the A.I.E.E. Winter General Meeting, New York, N.Y., January 18–22, 1954 by J. V. L. Hogan and G. M. Stamps, entitled "New Continuous-Feed Facsimile Scanner."

As stated heretofore, the information obtained from the microdensitometer 118 and its analysis of the infrared film record 98 is in the form of first and second video signals representative, respectively, of the terrain radiance in the short wavelength portion and the long wavelength portion of the infrared region. These signals may be simply recorded by means of a paper chart recorder or magnetic tape recording mechanism and traces produced on the paper chart may be visually compared with similar charts indicating the infrared differential emissivity of known material samples. Alternatively and preferably, such comparative analysis may be accomplished by electronic comparison of the signals derived from the two channels of the microdensitometer; that is, the signals may be subtractively compared to produce a single signal representative of the difference between the absolute radiances in the shorter wavelength portion and the longer wavelength portion. Similarly, and as indicated by the blocks 128 and 126 in FIG. 4, the differential radiance signal (obtained by subtractively comparing the two signals from the microdensitometer) may be correlated with similar signals obtained by radiometrically traversing a controlled terrain. More specifically, use of signals derived from a controlled terrain may be accomplished as follows: first, the radiometric apparatus carrying aircraft 10 of FIG. 1 may be used to traverse a terrain which has been previously surveyed in detail by manual methods or by other survey methods such as those commonly used in the petroleum industry. The radiometric record similar to film 98 which is produced from that controlled terrain may be fed through the dual channel microdensitometer apparatus referred to heretofore and a magnetic tape or magnetic drum recording of the differential infrared radiance characteristics of the controlled terrain to be produced. Since the mineralogical structure of the controlled terrain is previously known in considerable detail, the magnetic tape record produced by infrared radiometric surveying of that terrain provides a reference against which a similar magnetic tape record of the unknown terrain may be correlated to specifically identify the geophysical character of various substances in the unknown terrain which have counterparts in the controlled terrain. This type of comparison may be used to confirm the presence of petroleum indicative substances and structures in the unknown terrain, such as faults, domes, anticlines and stratigraphic traps.

A reference magnetic tape record, representative of a controlled terrain surveyed under known temperature conditions, may be used to calibrate the sensitivity of the radiometer appartus 12 and the processing techniques so that the absolute radiance and the differential radiance of a given material when it is at a particular temperature may be recognized in the analysis of the records made from an unknown terrain. More specifically, by infrared radiometric survey of a controlled terrain, a magnetic tape recording of the terrain in terms of its obsolute infrared radiance and differential radiance is provided. That record may be correlated with data obtained from a manual geological survey of the controlled terrain. Such correlation of data concerning a large number of incremental portions of the controlled terrain serves to calibrate the radiometer. A radiometric survey of a second previously unmapped terrain may then be conducted and the resulting film densities may be normalized to approximate the atmospheric conditions and temperature under which the controlled terrain was radiometrically surveyed. After such normalization, either electronic or manual comparison of the controlled terrain data with the unknown terrain data may be used to provide mineralogical identification of specific portions and specific objects in the unknown terrain. For example, a particular stone outcropping in the unknown terrain can be almost certainly identified by correlation of the differential infrared film densities obtained from the outcropping with the correlated differential film densities obtained from an outcropping of similar mineral in the controlled terrain. Thus the orgenic structures and accumulation of organic remains in the unknown terrain may be identified and geographically located with great accuracy without the necessity of a field geologist actually visiting the area in question. Further, correlation of data taken from an unknown terrain with data from a controlled terrain may be automatically accomplished and markings indicating the presence of specified materials in the unknown terrain may be automatically "printed out" on a conventional visible light aerial photographic map of the unknown terrain. Further, as stated heretofore, such data and such maps produced in accordance with the present invention may be supplemented by similar records from gamma ray survey of the unknown terrain and by magnetometric and gravimetric data obtained from unknown terrain by airborne instruments and methods. In addition, correlation of infrared photographic maps such as the film 98 with similar infrared photos made of the same unknown terrain at different daylight or nighttime hours will give information concerning differences in the temperature gradients experienced by different terrain constituents. This latter method of correlation seems to be very effective for locating surface and subsurface objects such as land mines and the like which are known to have a high heat conductivity which, therefore, tend to cool rapidly during the nighttime hours.

Persons skilled in the art will readily recognize a large number of other possible techniques for correlating infrared films made in accordance with the present invention with visible light photographs (or other known survey records) to produce various effects or to accentuate the output of information concerning particular characteristics and constituents of the terrain.

From the foregoing it should now be apparent that a method and apparatus for conducting geophysical surveys has been provided which is well adapted to fulfill the aforesaid objects of my invention, and which the invention has been described in particularity with respect to a specific method and apparatus which gives eminently satisfactory results, it will be understood that various changes may be made by those skilled in the art to which the invention most clearly pertains without departing from the spirit and scope of the invention as defined by the appended claims.

The embodiments of the invention in which an exclusive property or privilege is claimed are defined as follows:

1. The method of conducting geophysical surveys for location of mineral deposits which comprises:
   traversing an area to be surveyed with an aircraft having an infrared sensitive photographic apparatus;
   producing first and second photo records respectively representative of the radiation emanating from the terrain traversed with first and second portions of the infrared region of the electromagnetic radiation spectrum;
   controlling said photo-record production in accordance with the ground speed of said aircraft so as to enable subsequent correlation of said photo records with known geophysical features of said terrain; and
   subsequently identically processing said photo records and incrementally comparing the densities of same to produce a record indicative of the ratio between the radiation intensities in said first and second spectrum portions.

2. The method of conducting surveys for location of mineral deposits which comprises:
   traversing an area to be surveyed with an aircraft having a radiometric scanning apparatus;
   producing first and second photo records respectively representative of the infrared radiance of the terrain traversed within first and second portions of the infrared region;
   controlling said photo record production in accordance with the speed of said aircraft so as to enable subsequent correlation of said photo records with known geophysical features of said terrain; and
   subsequently identically processing said photo records and incrementally comparing the densities of same to produce a record indicative of the infrared radiance of each terrain area increment in both the shorter wavelength portion and the longer wavelength portion of the infrared region.

3. In a method for conducting geophysical surveys from an aircraft in flight:
   traversing an area to be explored with an aircraft which includes an infrared sensitive scanning apparatus;
   producing first and second records respectively indicative of variations in the radiation emitted by the earth within first and second portions of the electromagnetic spectrum as the aircraft moves along a predetermined traverse;
   subsequently correlatively comparing said records on a point-by-point basis to identify incremental portions of said area from which the intensity ratio between the emitted radiation in said first spectrum portion and the emitted radiation in said second spectrum portion has at least a predetermined value; and automatically marking a visible-light-photograph-aerial-map to provide visual indicia thereon of the specific incremental areas where said ratio exceeds said predetermined value.

4. A method of geophysical surveying which comprises the steps of:

flying an aircraft and radiometric apparatus associated therewith along a predetermined traverse over a terrain to be surveyed;

producing first and second photo records representative of infrared radiation images of said terrain, said first and second records being respectively representative of a shorter wavelength band within the infrared region and a longer wavelength band within said region;

subsequently incrementally comparing the densities of corresponding portions of said first and second records to produce an information signal indicative of the intensity differential between the terrain radiances in said longer and shorter wavelength bands; and charting said information signal on a photo-map of said terrain to visually indicate the differential infrared radiance characteristics of the materials in spaced portions of the terrain.

5. A method of geophysical surveying which comprises the steps of:

flying an aircraft and radiometric apparatus associated therewith along a predetermined traverse over a terrain to be surveyed;

producing first and second photo records representative of infrared radiation images of said terrain, said first and second records being respectively representative of a shorter wavelength band within the infrared region and a longer wavelength band within said region;

subsequently incrementally comparing the densities of corresponding portions of said first and second records to produce an information signal indicative of the intensity differential between the radiation in said longer and shorter wavelength bands which emanates from each incremental portion of said terrain;

charting said information signal on a photo map of said terrain to visually indicate the differential infrared emissivity characteristics of the materials in spaced portions of the terrain; and correlating the point-to-point variation in infrared emissivity characteristics with the surface intensity variations of gamma radiation from the radioactive constituents in the soil at spaced portions of the terrain.

6. A method of geophysical surveying which comprises the steps of:

flying an aircraft and radiometric apparatus associated therewith along a predetermined traverse over a terrain to be surveyed;

producing first and second photo records representative of infrared radiation images of said terrain, said first and second records being respectively representative of a lower wavelength band within the infrared region and a higher wavelength band within said region;

subsequently incrementally comparing the densities of corresponding portions of said first and second records to produce an information signal indicative of the intensity differential between the terrain radiances in said higher and lower bands for each incremental portion of said terrain;

charting said information signal on a photo map of said terrain to visually indicate the differential infrared radiance characteristics of the materials in spaced portions of the terrain; and producing a map of said terrain with the differential infrared emissivity of spaced portions of the terrain depicted being illustrated in different visible colors corresponding respectively to different predetermined differential radiances.

7. The method of conducting geophysical surveys for location of mineral deposits which comprises:

traversing an area to be surveyed with an aircraft having an infrared sensitive photographic apparatus;

producing first and second photo records respectively representative of the radiation emanating from the terrain traversed within first and second portions of the infrared regions of the electromagnetic radiation spectrum;

controlling said photo-record production in accordance with the ground speed of said aircraft so as to enable subsequent correlation of said photo records with known geophysical features of said terrain; and subsequently incrementally measuring the densities of said photo records to produce incremental information representative of the differential of infrared radiation between two infrared bands which emanates from various incremental portions of the traversed terrain.

8. The method of conducting geophysical surveys for location of mineral deposits which comprises:

traversing an area to be surveyed with an aircraft having an infrared sensitive photographic apparatus;

producing first and second photo records respectively representative of the radiation emanating from the terrain traversed within first and second portions of the infrared region which emanates from the terrain traversed;

controlling said photo record production in accordance with the ground speed of said aircraft so as to enable subsequent correlation of said photo records with known geophysical features of said terrain;

subsequently incrementally measuring the densities of said photo records to produce incremental information representative of the differential of infrared radiation between two infrared bands which emanates from various incremental portions of the traversed terrain; and correlating said incremental information with empirically predetermined information concerning the differential infrared emissivity of various materials and types of terrain to thereby identify the geologic nature of particular portions of the surveyed terrain.

References Cited by the Examiner

UNITED STATES PATENTS

| | | | |
|---|---|---|---|
| 2,165,214 | 7/1939 | Blau | 250—83.6 X |
| 2,563,333 | 8/1951 | Herzog | 250—83.6 |
| 3,011,853 | 12/1961 | Ilgenfritz | 250—83.3 X |
| 3,032,655 | 5/1962 | Romans | 250—83.6 X |
| 3,056,958 | 10/1962 | Anderson | 250—83.3 X |
| 3,069,493 | 12/1962 | Martel | 250—83.3 X |
| 3,143,648 | 8/1964 | Bradley et al. | 250—83.3 X |

OTHER REFERENCES

Wolfe, W. L., Infrared Reconnaissance, in Procedings of IRE, September 1959, vol. 47, No. 9, pages 1619–1921.

RALPH G. NILSON, *Primary Examiner.*

ARCHIE R. BORCHELT, *Examiner.*